United States Patent
Hafner

(10) Patent No.: US 10,218,792 B2
(45) Date of Patent: Feb. 26, 2019

(54) METHOD, APPARATUS, COMPUTER PROGRAM AND COMPUTER PROGRAM PRODUCT FOR TRANSMITTING DATA FOR USE IN A VEHICLE

(71) Applicant: Bayerische Motoren Werke Aktiengesellschaft, Munich (DE)

(72) Inventor: Johannes Hafner, Neufahrn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 293 days.

(21) Appl. No.: 15/079,493

(22) Filed: Mar. 24, 2016

(65) Prior Publication Data
US 2016/0205195 A1    Jul. 14, 2016

Related U.S. Application Data

(63) Continuation of application No. PCT/EP2014/071122, filed on Oct. 2, 2014.

(30) Foreign Application Priority Data

Oct. 22, 2013 (DE) .................. 10 2013 221 405
Oct. 31, 2013 (DE) .................. 10 2013 222 173

(51) Int. Cl.
*H04L 29/08* (2006.01)
*H04W 76/10* (2018.01)
(Continued)

(52) U.S. Cl.
CPC .......... *H04L 67/12* (2013.01); *H04L 67/2847* (2013.01); *H04L 67/306* (2013.01);
(Continued)

(58) Field of Classification Search
CPC ... H04L 67/12; H04L 67/2847; H04L 67/306; H04W 76/02; H04W 76/10; H04W 4/046; H04W 48/08; H04W 84/12
See application file for complete search history.

(56) References Cited

U.S. PATENT DOCUMENTS 8,060,068 B1* 11/2011 Mangal ............ H04M 3/42042
455/415
2006/0069749 A1 3/2006 Herz et al.
(Continued)

FOREIGN PATENT DOCUMENTS

DE   10 2010 002 740 A1   9/2011
DE   10 2011 055 280 A1   5/2012
(Continued)

OTHER PUBLICATIONS

International Search Report (PCT/ISA/210) issued in PCT Application No. PCT/EP2014/071122 dated Jan. 20, 2015 with English translation (five pages).
(Continued)

*Primary Examiner* — Andrew Lai
*Assistant Examiner* — Sumitra Ganguly
(74) *Attorney, Agent, or Firm* — Crowell & Moring LLP

(57) ABSTRACT

A method is provided for transmitting data for use in a vehicle. The method involves a user request for the transmission and reproduction of desired data from a first source by way of a mobile radio link being taken as a basis for ascertaining whether the desired data are also provided by a second source independently of the mobile radio link. The desired data are received in the vehicle from the second source for reproduction for a user if the desired data (DAT) are also provided by the second source independently of the mobile radio link.

14 Claims, 3 Drawing Sheets

(51) Int. Cl.
*H04W 4/04* (2009.01)
*H04W 48/08* (2009.01)
*H04W 84/12* (2009.01)

(52) U.S. Cl.
CPC .......... *H04W 4/046* (2013.01); *H04W 48/08* (2013.01); *H04W 76/10* (2018.02); *H04W 84/12* (2013.01)

(56) References Cited

U.S. PATENT DOCUMENTS

| | | | |
|---|---|---|---|
| 2007/0213903 A1* | 9/2007 | Pantle | B60R 21/013 701/45 |
| 2011/0143667 A1 | 6/2011 | Cugnini et al. | |
| 2012/0129475 A1 | 5/2012 | Mere | |

FOREIGN PATENT DOCUMENTS

| | | | | |
|---|---|---|---|---|
| EP | 1 944 870 | A1 | 7/2008 | |
| EP | 2 012 448 | A2 | 1/2009 | |
| EP | 2012448 | A2 * | 1/2009 | ............ H04H 20/24 |
| EP | 2 418 791 | A1 | 2/2012 | |
| EP | 2 573 963 | A1 | 3/2013 | |
| WO | WO 01/52198 | A2 | 7/2001 | |
| WO | WO-0152198 | A2 * | 7/2001 | ............ G06Q 30/06 |

OTHER PUBLICATIONS

German-language Written Opinion (PCT/ISA/237) issued in PCT Application No. PCT/EP2014/071122 dated Jan. 20, 2015 (five pages).

German Search Report issued in counterpart German Application No. 10 2013 222 173.8 dated Jul. 30, 2014 with partial English translation (15 pages).

* cited by examiner

METHOD, APPARATUS, COMPUTER PROGRAM AND COMPUTER PROGRAM PRODUCT FOR TRANSMITTING DATA FOR USE IN A VEHICLE

CROSS REFERENCE TO RELATED APPLICATIONS

This application is a continuation of PCT International Application No. PCT/EP2014/071122, filed Oct. 2, 2014, which claims priority under 35 U.S.C. § 119 from German Patent Application No. 10 2013 221 405.7, filed Oct. 22, 2013, and 10 2013 222 173.8, filed Oct. 31, 2013, the entire disclosures of which are herein expressly incorporated by reference.

BACKGROUND AND SUMMARY OF THE INVENTION

The invention relates to a method for transmitting data for use in a vehicle. The invention also relates to an apparatus for transmitting data for use in a vehicle. The invention also relates to a computer program and a computer program product for transmitting data for use in a vehicle.

The use of digital audio and/or video data, for example, in a vehicle is becoming more and more prevalent. If these data are transmitted using a mobile radio connection, costs are frequently incurred.

The object on which the invention is based is to provide a method and an apparatus which contribute to efficiently transmitting data.

This and other objects are achieved by a method for transmitting data for use in a vehicle, as well as a corresponding apparatus. According to the method, a user request for the transmission and reproduction of desired data from a first source by way of a mobile radio connection is taken as a basis for determining whether the desired data are also provided by a second source independently of a mobile radio connection. If the desired data are also provided by a second source independently of the mobile radio connection, the desired data are received in the vehicle from the second source for reproduction for a user.

A mobile radio connection is distinguished, in particular, by the fact that a 1:1 connection is established. In other words, something is requested via the mobile radio connection and is then transmitted in the other direction.

Transmission costs are often incurred in the case of a mobile radio connection, for example for each transmitted megabyte and/or as part of a volume-based tariff in which a predefined quantity of data can be transmitted for a predefined inclusive price. Since the second source is independent of the mobile radio connection and, in particular, is free of data costs, the desired data can possibly be transmitted cost-effectively and/or at no cost, in particular. Therefore, it is possible to achieve very cost-effective transmission of the desired data, for which mobile radio costs would otherwise be incurred. Furthermore, the desired data always have to be explicitly requested for the mobile radio connection. Since the second source is independent of the mobile radio connection, simpler and particularly efficient data transmission can therefore be achieved.

According to one advantageous configuration, the second source is a broadcast radio source and/or a WLAN access point.

The WLAN access point has, in particular, a connection to the Internet.

A broadcast radio connection to a broadcast radio source is distinguished, in particular, by virtue of the fact that it is a 1:n connection. In other words, a transmitter transmits the same data to a large number of receivers. In this case, there is often only a transmission from the transmitter to the receiver and no transmission from the receiver to the transmitter, that is to say no individual data can be explicitly requested by the receiver.

Broadcast radio is very often free or is associated only with relatively low costs, for example subscription fees. Therefore, this makes it possible to achieve very cost-effective data transmissions, in particular. Furthermore, particularly efficient data transmission is possible just using broadcast radio.

According to another advantageous configuration, the second source is a local data memory of the vehicle.

As a result, the desired data can be provided very quickly and in a cost-neutral manner if they are stored in the local data memory.

According to another advantageous configuration, a predefined user profile is taken as a basis for determining which future data will likely be requested by the user in the future. It is determined whether the future data are provided by a broadcast radio source as broadcast radio data. The broadcast radio data provided by the broadcast radio source are stored in the local data memory as stored data for future reproduction.

This increases a likelihood of the desired data being available in the local data memory in the form of stored data.

If the desired data are, for example, audio and/or video data, the predefined user profile is determined, in particular, on the basis of, for example, listening and/or viewing habits of the user, for example which genre, which artist and/or which type of music is/are frequently retrieved by the user. Alternatively or additionally, the desired data are, for example, data from data services, for example traffic data, additional data such as album covers and the like. The determination of whether the future data are provided by the broadcast radio source as broadcast radio data can be carried out, for example, on the basis of program information provided by the broadcast radio source, for example a so-called Electronic Program Guide. Electronically distributed information relating to a current radio and/or television program is referred to as an electronic program guide. The electronic program guide is generally broadcast by the broadcast radio source as an additional offer and can be received at no cost. Alternatively or additionally, this can also be determined by means of the mobile radio connection using Internet data which have, for example, an item of information relating to what is currently being played by which broadcast radio source. Alternatively or additionally, it is possible to use the mobile radio connection to search databases belonging to the respective broadcast radio source and/or databases belonging to providers which analyze and catalog current playback content. Alternatively or additionally, the content can be identified with the aid of a frequency analysis of current broadcast content after comparison with a database. The frequency analysis is distinguished, for example, by virtue of the fact that the respective content is uniquely identified using data and/or frequency characteristics, for example.

According to another advantageous configuration, information representative of a popularity of data offered by the first source is retrieved from a database using the mobile radio connection. Retrieved information is taken as a basis for determining which future data will likely be requested by the user in future. It is determined whether the future data are provided by a broadcast radio source as broadcast radio data. The broadcast radio data provided by the broadcast radio source are stored in the local data memory as stored data for future reproduction.

This increases the likelihood of the desired data being available in the local data memory as stored data, in particular if a user profile is not yet available. Such information is, for example, information relating to top positions such as the most frequently requested, the best rated, the most popular and the like.

According to another advantageous configuration, the stored data are checked for interference. If the stored data have interference, the interference is removed by determining whether the stored data are again provided by the broadcast radio source as broadcast radio data. If the stored data are again provided by the broadcast radio source as broadcast radio data, the broadcast radio data provided by the broadcast radio source are again stored in the local data memory as stored data.

Data recorded using broadcast radio often have interference, for example extraneous content, speech of presenters, advertising played too early or before the end, traffic messages and/or reception interference. The quality of the stored data can be increased by virtue of the fact that the broadcast radio data are received and stored again.

According to another advantageous configuration, the stored data are checked for interference. If the stored data have interference, the interference is removed by correcting a part of the stored data which has interference using data which are requested from the first source for this purpose by way of the mobile radio connection and/or are received using the broadcast radio source.

The correction of locations which have interference using corrected data can be carried out using audio correlation, in particular. In this case, the stored data and the data requested from the first source for this purpose by way of the mobile radio connection and/or received by way of the broadcast radio source are decoded, for example, in order to obtain an information sequence, and a first decoder sequence of the stored data and a second decoder sequence of the requested and/or received data are produced in this case. The first and second decoder sequences are compared with one another on the basis of predefined criteria using a correlation device and that decoder sequence which is most similar to the corresponding original information sequence is respectively selected from the two respective first and second decoder sequences which correspond to one another in terms of time. An output sequence is formed from the successive selected decoder sequences and is then stored again, in coded form, as stored data. The correlation device includes, for example, a device for synchronizing decoder sequences, a data processor, a changeover device and/or a correction stage for correcting erroneous decoder sequences. This makes it possible to correct the interference in the stored data in a very simple and cost-effective manner.

According to another advantageous configuration, the desired data include audio and/or video data.

There are many free broadcast radio sources for audio and/or video data, in particular, with the result that the likelihood of the desired data being available at no cost is increased.

According to another aspect, the invention is distinguished by a computer program for transmitting data for use in a vehicle, the computer program being designed to carry out the method for transmitting data for use in a vehicle or an advantageous configuration of the method on a data processing apparatus.

According to another aspect, the invention is distinguished by a computer program product comprising executable program code, the program code carrying out the method for transmitting data for use in a vehicle or an advantageous configuration of the method during execution by a data processing apparatus.

The computer program product includes, in particular, a medium which can be read by the data processing apparatus and stores the program code.

Other objects, advantages and novel features of the present invention will become apparent from the following detailed description of one or more preferred embodiments when considered in conjunction with the accompanying drawings.

BRIEF DESCRIPTION OF THE DRAWINGS

Elements with the same design or function are identified with the same reference symbols throughout the figures.

DETAILED DESCRIPTION OF THE DRAWINGS

Figure 1:
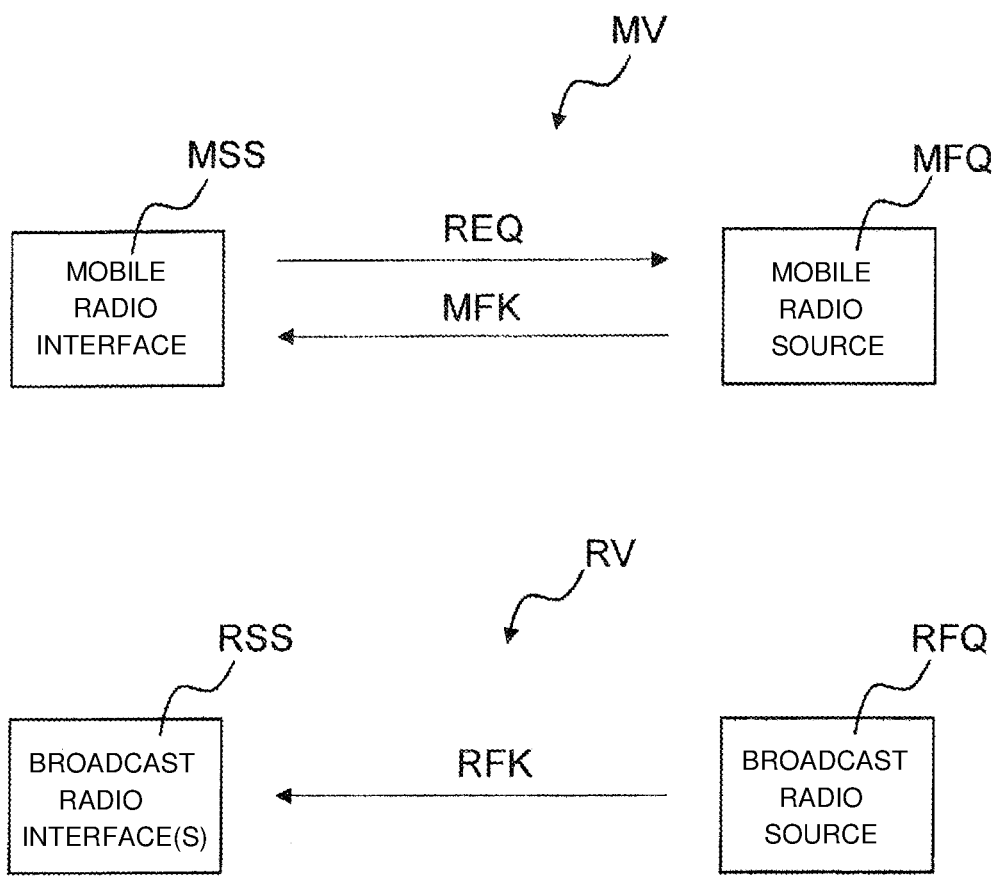
FIG. 1 is a diagram showing a mobile radio connection and a broadcast radio connection.

FIG. 1 shows an important difference between a mobile radio connection MV and a broadcast radio connection RV. The mobile radio connection MV is a 1:1 connection. This means that a mobile radio interface MSS transmits a request REQ to a mobile radio source MFQ and data are then transmitted from the mobile radio source MFQ to the mobile radio interface MSS via a mobile radio channel MFK. In contrast to this, the broadcast radio connection RV is a 1:n connection. In the case of the broadcast radio connection RV, data are therefore transmitted from a broadcast radio source RFQ to a large number of individual broadcast radio interfaces RSS via a broadcast radio channel RFK. A specific request for data is not possible, that is to say an individual request and/or influence on the contents of the data, in particular.

The mobile radio connection MV is implemented, for example, by use of a mobile radio standard, for example a mobile radio standard of the 3rd Generation Partnership Projects, for example Global System for Mobile Communications (GSM), Universal Mobile Telecommunications System (UMTS), Long Term Evolution (LTE), Long Term Evolution Advanced (LTE-Advanced) and/or a 5G standard. GSM is a standard for fully digital mobile radio networks which can be used for telephony but also for circuit-switched and packet-switched data transmission and short messages. It is the first standard of the so-called second generation (2G). UMTS is a mobile radio standard of the third generation (3G), with which considerably higher data transmission rates than with the GSM standard are possible. LTE is a mobile radio standard of the fourth generation which, with up to 300 megabits per second, can achieve considerably higher download rates than UMTS. The basic scheme of UMTS is retained in LTE. LTE-Advanced is downward compatible with LTE.

The broadcast radio connection RV is implemented, for example, using a broadcast radio standard, for example Satellite Digital Audio Radio Services (SDARS), Digital Audio Broadcasting/Digital Multimedia Broadcasting (DAB+/DMB), amplitude modulation/frequency modulation (AM/FM), HD radio, Digital Video Broadcasting—Terrestrial (DVBT/T2), Digital Video Broadcasting–Satellite (DVB-S/S2). SDARS is a satellite-based radio system in North America. DAB or DAB+ is a digital transmission standard for the terrestrial reception of digital radio. DMB is a digital transmission system via satellite (S-DMB) or terrestrial transmission (T-DMB), in which case T-DMB is based on the radio standard DAB which has been expanded with audiovisual contents. FM is a modulation method in which the carrier frequency is changed by the signal to be transmitted. In contrast with amplitude modulation, frequency modulation enables a greater dynamic range of the information signal. HD radio is a proprietary digital radio system which is used in the USA and was developed in addition to DAB. DVB-T/T2 denotes the terrestrial distribution of digital television signals. DVB-S/S2 denotes a broadcast standard for distributing audio/video content via satellite.

Figure 2:
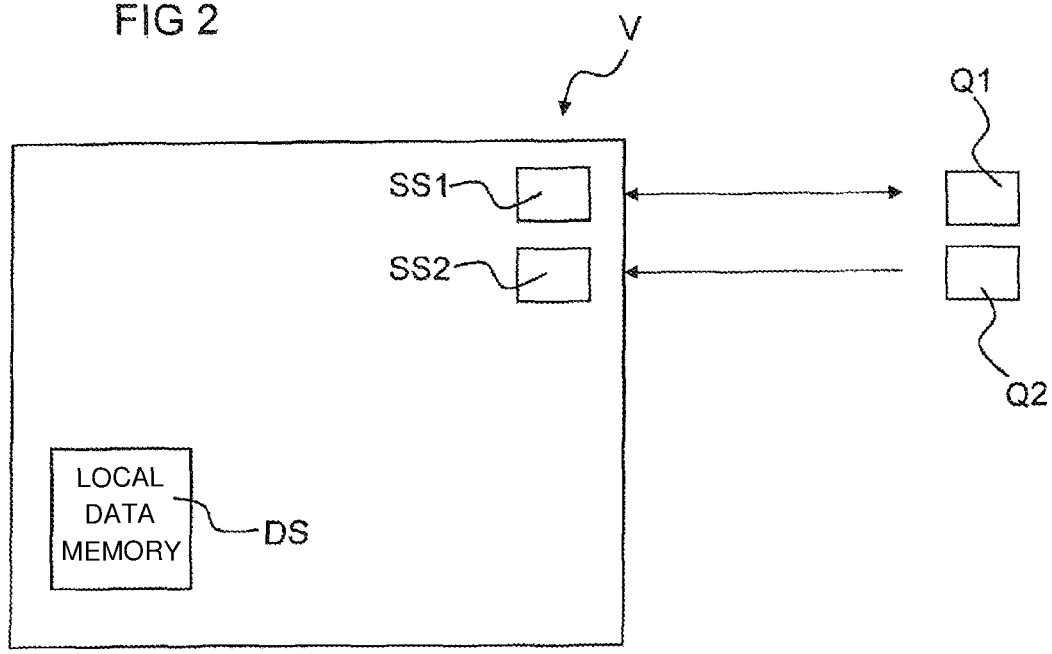
FIG. 2 is a diagram of an apparatus for transmitting data for use in a vehicle.

FIG. 2 shows an apparatus V. The apparatus V has a first interface SS1 and a second interface SS2, for example. The first interface SS1 is designed, for example, to request and receive data from a first source Q1 via the mobile radio connection MV. The first source Q1 is therefore the mobile radio source MFQ, in particular. The second interface SS2 is designed, for example, to receive data from a second source Q2 independently of the mobile radio connection MV. The second source Q2 is the broadcast radio source RFQ, for example.

The apparatus V also includes a computing unit and/or a data and program memory, for example. The computing unit and the data and program memory are formed in one structural unit, for example, and/or are distributed among two or more structural units.

The apparatus V also has, for example, a local data memory DS which may be formed in a separate structural unit, for example. The local data memory DS is part of a so-called "Entertainment Content Server", in particular.

The data and program memory of the apparatus V stores, in particular, a plurality of programs which are executed during operation of the apparatus V.

Figure 3:
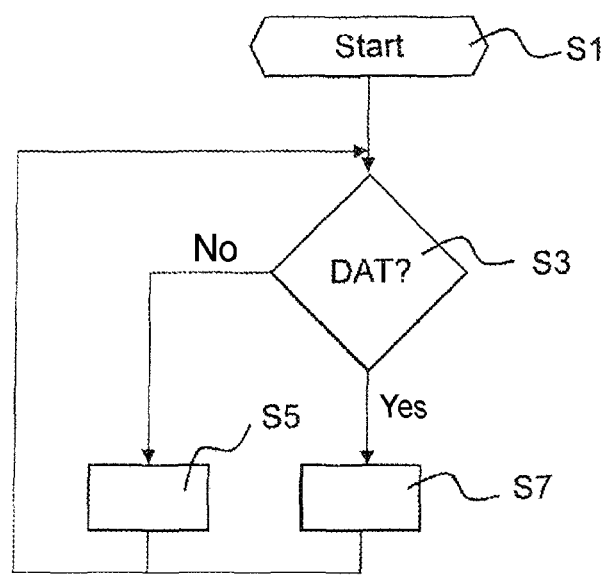
FIG. 3 is a first flowchart.

FIG. 3 shows a first flowchart of a first program which is stored, for example, in the data and program memory of the apparatus V and can be executed by the computing unit of the apparatus V.

The program is started in a step S1, for example on the basis of a user request for the transmission and reproduction of desired data DAT from a first source Q1 by way of the mobile radio connection MV. Such desired data DAT are audio and/or video data, for example.

A step S3 determines whether the desired data DAT are also provided by the second source Q2 independently of the mobile radio connection MV. For this purpose, an item of program information, for example, provided by the broadcast radio source RFQ, for example a so-called electronic program guide, is searched. Alternatively or additionally, this is determined by way of the mobile radio connection MV using Internet data which have, for example, an item of information relating to what is currently being played by which broadcast radio source RFQ. Alternatively or additionally, databases of the respective broadcast radio source RFQ are searched using the mobile radio connection MV. Alternatively or additionally, the contents can be identified with the aid of a frequency analysis of currently reproduced contents from the broadcast radio source RFQ after comparison with a database. The frequency analysis is distinguished, for example, by the fact that the respective contents are uniquely identified using data and/or frequency characteristics, for example, in particular using so-called fingerprinting. The database is a music database, for example. The music database is stored in the local data memory DS, for example. Alternatively or additionally, the music database may be stored on a server outside the vehicle, for example a back-end server, and the frequency analysis may be carried out on the back-end server.

The second source Q2 includes the broadcast radio source RFQ, for example. Alternatively or additionally, the second source Q2 includes the local data memory DS, for example.

In a step S5, if the desired data DAT are not provided by the second source Q2, the desired data DAT are requested from the first source Q1 by way of the mobile radio connection MV and are received for reproduction for a user.

In a step S7, the desired data DAT are received in the vehicle from the second source Q2 for reproduction for the user. For this purpose, for example, the information needed to receive the desired data DAT, for example a frequency, a channel and/or a program/service ID, is transferred to the "Entertainment Content Server" which controls the broadcast radio source RFQ, with the result that reproduction can begin.

After step S5 or S7, the program is started again in step S1.

Figure 4:
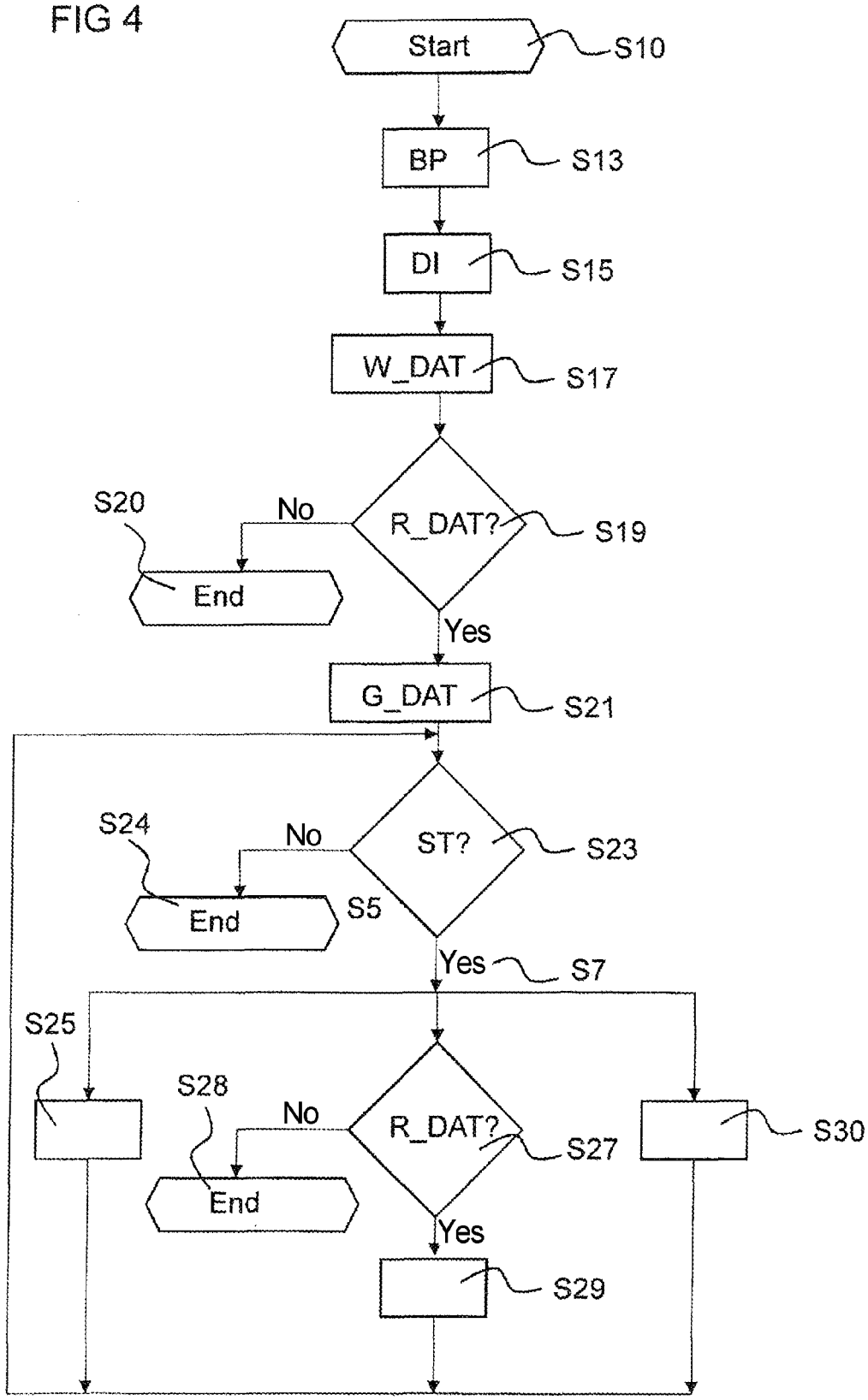
FIG. 4 is a second flowchart.

In order to increase a likelihood of the desired data DAT being in the local data memory DS if the second source Q2 includes the local data memory DS, the data and program memory of the apparatus V stores, in particular, a further program which is started in step S10 and is explained below using the flowchart in FIG. 4.

A predefined user profile BP is provided in step S13. The predefined user profile BP is determined for this purpose, in particular, on the basis of, for example, listening and/or viewing habits of the user, for example which genre, which artist and/or which type of music is/are frequently retrieved by the user.

In step S15, information DI representative of a popularity of data offered by the first source Q1 is retrieved from a database by way of the mobile radio connection MV. Such information DI is, for example, information relating to top positions such as the most frequently requested, the best rated, the most popular and the like.

In a step S17, the predefined user profile BP and/or the retrieved information DI is/are taken as a basis for determining which future data W_DAT will likely be requested by the user in future.

The determination of which future data W_DAT will likely be requested by the user in future is carried out, in particular, according to the following mechanism: if a user profile BP is not yet available or only a user profile BP with a few items of information is available, the information DI is used for the determination in a first stage. This is the case, for example, if the user is a new user and/or a new vehicle. If the user has connected an entertainment electronic unit to the apparatus V, for example, the contents of the entertainment electronic unit are analyzed in a second stage in order to determine information relating to a customer behavior of the user therefrom. The entertainment electronic unit comprises, for example, a smartphone, an external data memory and/or data relating to the user which are stored in the so-called "cloud". In a third stage, the user profile provided in step S15 is used to determine which future data W_DAT will likely be requested by the user in future.

A step S19 determines whether the future data W_DAT are provided by the broadcast radio source RFQ as broadcast radio data R_DAT. For this purpose, for example, the program information provided by the broadcast radio source RFQ, for example the so-called electronic program guide, is searched. Alternatively or additionally, this is determined by means of the mobile radio connection MV using the Internet data. Alternatively or additionally, databases of the respective broadcast radio source RFQ are searched using the mobile radio connection MV. Alternatively or additionally, the reproduced contents are identified for this purpose with the aid of the frequency analysis of the currently reproduced contents from the broadcast radio source RFQ after comparison with the database.

If the future data W_DAT are not provided by the broadcast radio source RFQ as broadcast radio data R_DAT, the program is continued in a step S20 in which it is ended.

If the future data W_DAT are provided by the broadcast radio source RFQ as broadcast radio data R_DAT, the program is continued in a step S21. In step S21, the broadcast radio data R_DAT provided are stored in the local data memory DS as stored data G_DAT for future reproduction. For this purpose, for example, the information needed to receive the broadcast radio data R_DAT, for example a frequency, a channel and/or a program/service ID, is transferred to the "Entertainment Content Server" which controls the broadcast radio source RFQ, with the result that recording can begin. In particular, the local data memory DS is used as a ring memory, with the result that older recordings are overwritten if a reserved memory area is full.

In a step S23, the stored data G_DAT are checked for interference ST. Analysis algorithms which analyze an audio signal, for example, for signals which do not belong to the audio signal can be used, for example, to identify interference ST. For this purpose, the coded contents can be identified, for example, with the aid of the frequency analysis of contents coded in the stored data G_DAT and after comparison with the database. The database is the music database, for example. This music database stores, for example, pieces of music completely in their frequency characteristics. Deviations between the stored characteristics and recorded characteristics can therefore be compared and all deviations from the stored characteristics can be identified.

If the stored data G_DAT do not have any interference ST, the program is continued and ended in a step S24.

If the stored data G_DAT have interference ST, the program is continued in a step S25, for example. Alternatively or additionally, the program is continued in a step S27. Alternatively or additionally, the program is continued in a step S30.

In step S25, the contents stored using the stored data G_DAT are attenuated, in particular muted, at the location of the interference ST and are then stored again as stored data G_DAT. The program is then continued in step S23.

Step S27 checks whether the stored data G_DAT are again provided by the broadcast radio source RFQ as broadcast radio data R_DAT. If this is not the case, the program is continued and ended in a step S28, for example. If this is the case, the program is continued in a step S29.

In step S29, the broadcast radio data R_DAT again provided by the broadcast radio source RFQ are again stored in the local data memory DS as stored data G_DAT. The program is then continued in step S23.

In step S30, the interference ST is removed by correcting a part of the stored data G_DAT which has interference with data which are requested for this purpose from the first source Q1 using the mobile radio connection MV and/or are received using the broadcast radio source RFQ. The program is then continued in step S23.

The procedure shown can be used to contribute to transmitting the desired data DAT in a very cost-effective manner.

LIST OF REFERENCE SYMBOLS

MV Mobile radio connection
MSS Mobile radio interface
REQ Request
MFQ Mobile radio source
MFK Mobile radio channel
RV Broadcast radio connection
RSS Broadcast radio interface
RFQ Broadcast radio source
RFK Broadcast radio channel
V Apparatus
SS1 First interface
SS2 Second interface
Q1 First source
Q2 Second source
DS Data memory
DAT Desired data
BP User profile
DI Information
W_DAT Future data
R_DAT Broadcast radio data
G_DAT Stored data
ST Interference The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting data for use in a vehicle, the method comprising:
    receiving a request from an occupant of the vehicle, wherein the request is for desired data to be transmitted and reproduced from a first source by way of a mobile radio connection between the vehicle and the first source;
    determining, based on the request, whether the desired data may be transmitted and reproduced from a second source independently of the mobile radio connection;
    if it is determined that the desired data may be transmitted and reproduced from the second source independently of the mobile radio connection, receiving the desired data in the vehicle from the second source; and
    reproducing the desired data to the occupant in response to the request.

2. The method as claimed in claim 1, wherein the second source comprises a broadcast radio source and/or a WLAN access point.

3. The method as claimed in claim 1, wherein the second source comprises a local data memory of the vehicle.

4. The method as claimed in claim 3, further comprising:
    determining future data likely to be requested by the user in future based on a predetermined user profile;
    determining whether the future data are provided by a broadcast radio source as broadcast radio data; and
    storing the broadcast radio data provided by the broadcast radio source in the local data memory as stored data for future reproduction.

5. The method as claimed in claim 4, further comprising:
retrieving information representative of a popularity of data offered by the first source from a database using the mobile radio connection;
determining future data likely to be requested by the user in the future based on the retrieved information;
determining whether the future data are provided by a broadcast radio source as broadcast radio data; and
storing the broadcast radio data provided by the broadcast radio source in the local data memory as stored data for future reproduction.

6. The method as claimed in claim 3, further comprising:
retrieving information representative of a popularity of data offered by the first source from a database using the mobile radio connection;
determining future data likely to be requested by the user in the future based on the retrieved information;
determining whether the future data are provided by a broadcast radio source as broadcast radio data; and
storing the broadcast radio data provided by the broadcast radio source in the local data memory as stored data for future reproduction.

7. The method as claimed in claim 6, wherein:
checking the stored data for interference;
if the stored data have interference, the interference is removed by correcting a part of the stored data which has interference using data which are requested from the first source for correcting the interference by way of the mobile radio connection and/or are received using the broadcast radio source.

8. The method as claimed in claim 4, wherein:
checking the stored data for interference;
if the stored data have interference, the interference is removed by determining whether the stored data are again provided by the broadcast radio source as broadcast radio data and, if the stored data are again provided by the broadcast radio source as broadcast radio data, the broadcast radio data provided by the broadcast radio source are again stored in the local data memory as stored data.

9. The method as claimed in claim 5, wherein:
checking the stored data for interference;
if the stored data have interference, the interference is removed by determining whether the stored data are again provided by the broadcast radio source as broadcast radio data and, if the stored data are again provided by the broadcast radio source as broadcast radio data, the broadcast radio data provided by the broadcast radio source are again stored in the local data memory as stored data.

10. The method as claimed in claim 9, wherein:
checking the stored data for interference;
if the stored data have interference, the interference is removed by correcting a part of the stored data which has interference using data which are requested from the first source for correcting the interference by way of the mobile radio connection and/or are received using the broadcast radio source.

11. The method as claimed in claim 4, wherein:
checking the stored data for interference;
if the stored data have interference, the interference is removed by correcting a part of the stored data which has interference using data which are requested from the first source for correcting the interference by way of the mobile radio connection and/or are received using the broadcast radio source.

12. The method as claimed in claim 1, wherein the desired data comprise audio and/or video data.

13. An apparatus for transmitting data for use in a vehicle, the apparatus comprising a computing unit having data and program memory, the computing unit being configured to execute a program to:
receive a request from an occupant of the vehicle, wherein the request is for desired data to be transmitted and reproduced from a first source by way of a mobile radio connection between the vehicle the a first source;
determine, based on the request, whether the desired data may be transmitted and reproduced from a second source independently of the mobile radio connection;
if it is determined that the desired data may be transmitted and reproduced from the second source independently of the mobile radio connection, cause the desired data to be received in the vehicle from the second source; and
reproduce the desired data to the occupant in response to the request.

14. A computer program product comprising a non-transitory computer readable medium having stored thereon executable program code to carry out a method for transmitting data for use in a vehicle, the method comprising:
receiving a request from an occupant of the vehicle, wherein the request is for desired data to be transmitted and reproduced from a first source by way of a mobile radio connection between the vehicle and the first source;
determining, based on the request, whether the desired data may be transmitted and reproduced from a second source independently of the mobile radio connection;
if it is determined that the desired data may be transmitted and reproduced from the second source independently of the mobile radio connection, receiving the desired data in the vehicle from the second source; and
reproducing the desired data to the occupant in response to the request.

* * * * *